Oct. 15, 1968   TSUNEZO MORI   3,405,820
DUST-PROOF HOPPER

Filed Sept. 26, 1966   3 Sheets-Sheet 1

INVENTOR
TSUNEZO MORI
BY
Nolte & Nolte
ATTORNEYS

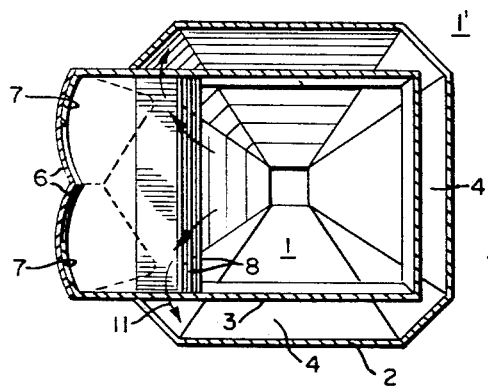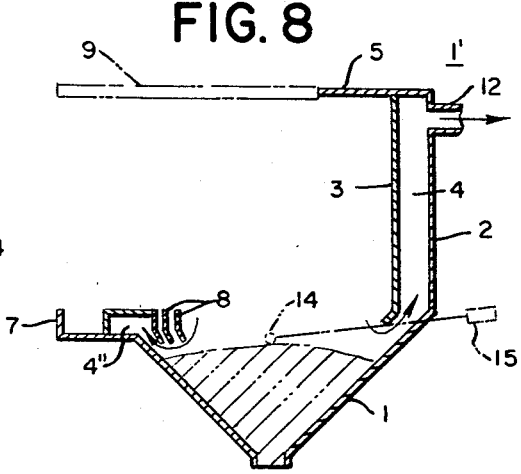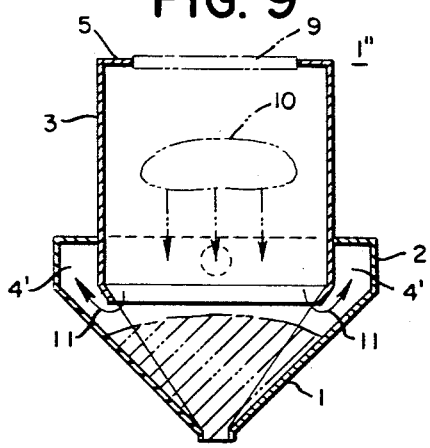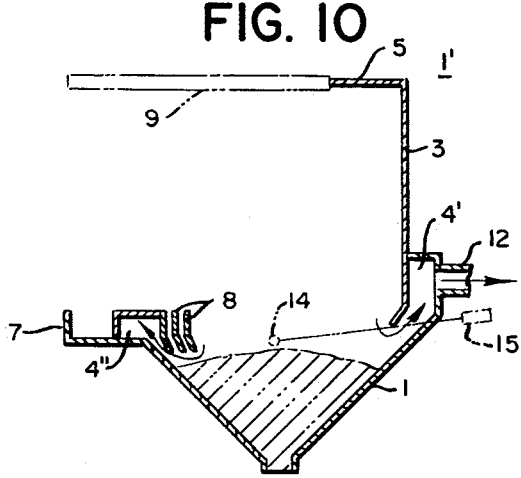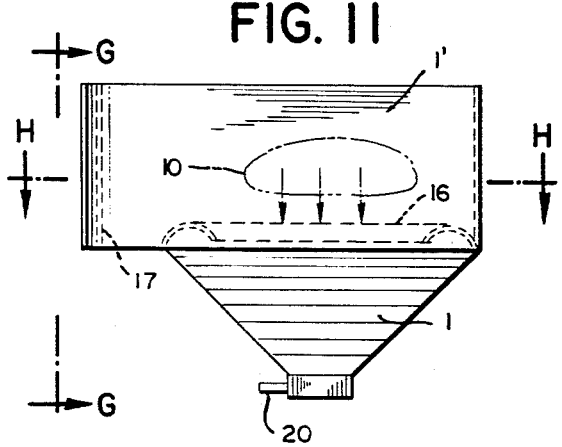

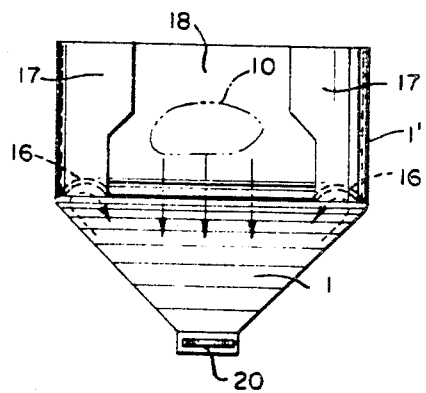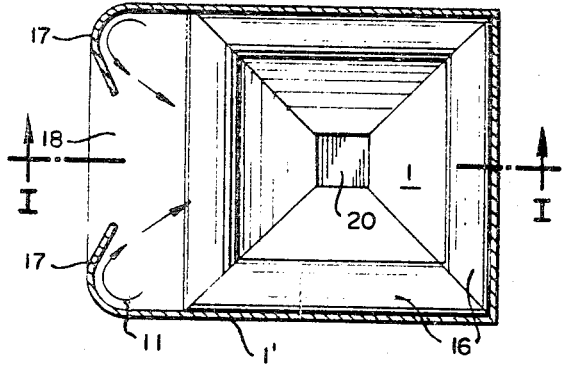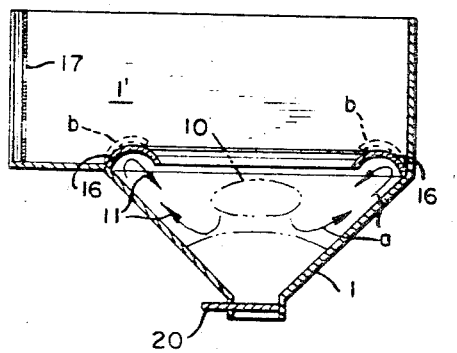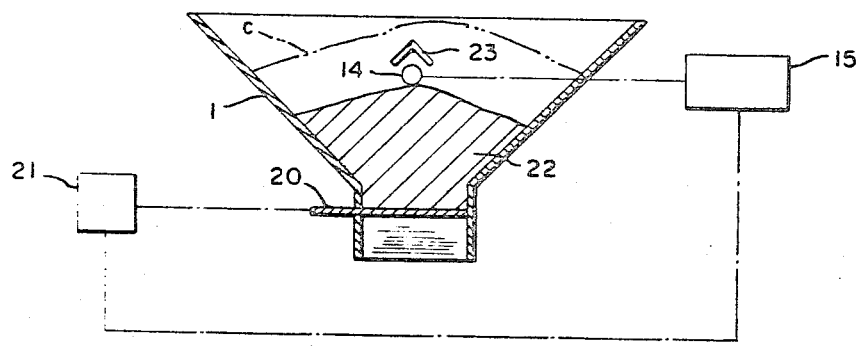

United States Patent Office 3,405,820
Patented Oct. 15, 1968

3,405,820
DUST-PROOF HOPPER
Tsunezo Mori, Tokyo-to, Japan, assignor to Ishikawa-jima-Harima Jukogyo Kabushiki Kaisha, Tokyo-to, Japan, a company of Japan
Filed Sept. 26, 1966, Ser. No. 581,798
Claims priority, application Japan, Apr. 21, 1966, 41/25,475; May 11, 1966, 41/43,959, 41/43,960
8 Claims. (Cl. 214—17)

ABSTRACT OF THE DISCLOSURE

A hopper for containing a material which tends to create dust when loaded into the hopper. The hopper includes a lower material-containing portion terminating in a top edge. A shrouding is fixed to the lower material-containing portion of the hopper and extends from the top edge thereof upwardly through a distance sufficient to extend around a bucket or the like from which material is emptied into the material-containing portion of the hopper. This shrouding is open at its top and at its front so that the bucket or the like can have free access to the interior of the shrouding. While this shrouding will in itself greatly contribute to escape of dust, escape of dust is further prevented by providing the structure with suitable reversing baffles which direct dust back down into the material containing portion of the hopper.

---

Since much dust is generated in transfusing cargo into a hopper, which gives bad effects to the machinery equipment or causes public nuisance, a means of dust-proof handling is strongly needed.

The present invention is related to a dust-proof hopper in which the dust generated in transfusing the cargo is disposed in such a way as to prevent the dust from flying out the said hopper. It should be noted that, in transfusing the cargo into the hopper by a grab bucket, if the said grab is opened at a high place to let the cargo fall into the hopper the surface part of the cargo already existing in the hopper will be scattered into the air by the falling cargo and much dust will be generated in consequence; also in letting the cargo fall from a skip or a dump car through a long distance, the part of the cargo at surface, which has been poured into the hopper in advance, will be scattered into the air, generating in consequence much dust. Therefore, it is desirable that the opening operation of the bucket mouth be carried out in the neighborhood of the surface of the cargo existing in the hopper.

However, the operation to open the bucket in the neighborhood of the surface of the cargo already existing in the hopper after shifting said bucket above the said hopper and successively letting the former go down into the latter cannot avoid a decrease in the operational efficiency in comparison with that in the case where the bucket is opened on arriving at the above of the hopper because the lowering operation must be added.

The present invention is also related to a dust-proof hopper that does not decrease efficiency in operation and at the same time is capable of preventing most dust from being generated.

Figure 1:
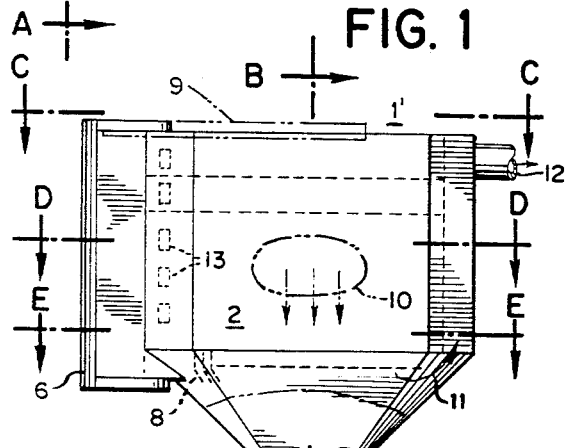
Figure 2:
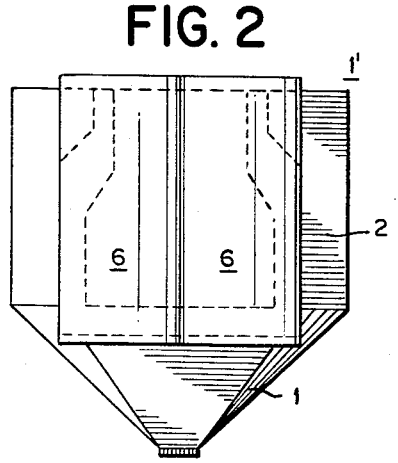
Figure 3:
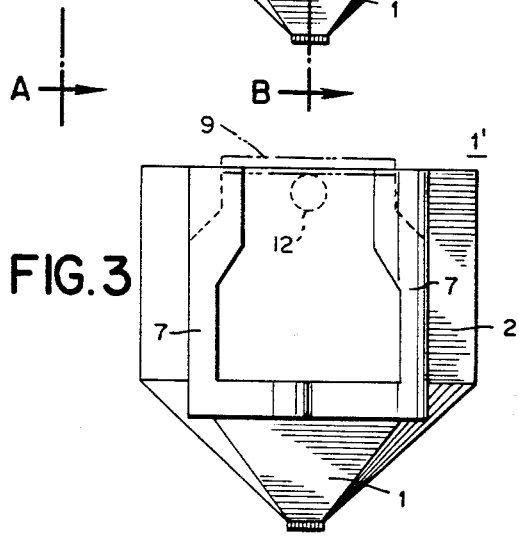
Figure 4:
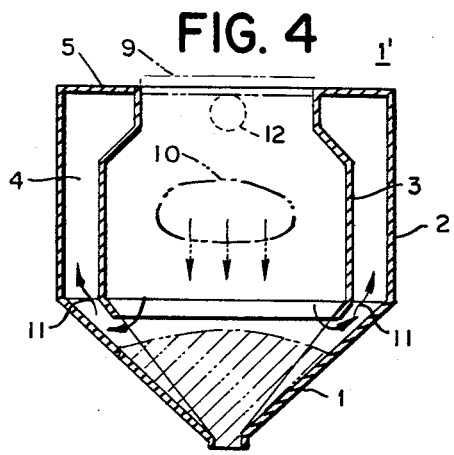
Figure 5:
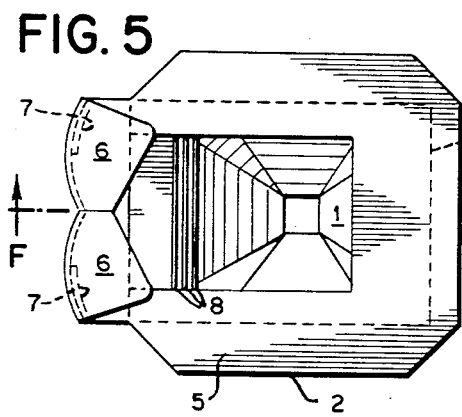
Figure 6:
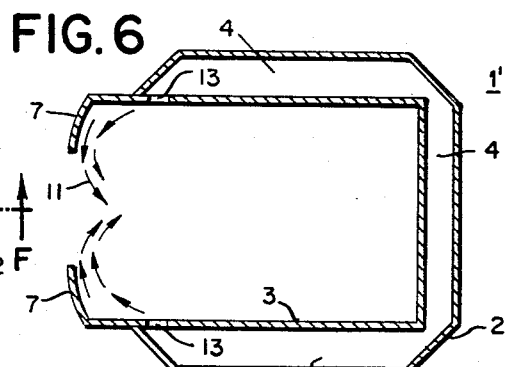

Here is the explanation of an embodiment of the present invention with reference to the attached drawings:

FIG. 1 is a lateral view of an example of the dust-proof hopper according to the present invention, FIGS. 2 and 4 are elevation plans seen in directions of A and B in FIG. 1, FIG. 3 is an elevational plan in the direction of A in FIG. 1 with the doors being taken away, FIGS. 5 and 7 are ground plans in the directions of C and E in FIG. 1, FIG. 6 is a ground plan in the direction of D in FIG. 1 with the door being taken away, FIG. 8 is a lateral view in the direction of F in FIG. 5, FIGS. 9 and 10 show the example where the duct is formed low, corresponding to FIGS. 4 and 8, FIG. 11 is a side view of another embodiment of the dust-proof hopper of the present invention, FIG. 12 is a front view along the line G in FIG. 11, FIG. 13 is a cross-sectional ground plan along the line H in FIG. 11, FIG. 14 is a cross-sectional lateral view in the direction of I in FIG. 13 and FIG. 15 is a diagrammatic schema explaining the installation of a level detector to be equipped in the dust-proof hopper according to the present invention.

In an outer shell 2 having the front open is installed an inner shell 3 with open front in such a way as to form a duct 4 between the walls of the two shells in the left, right, and rear, and to form a shrouding 1' comprised by connecting the inner space of the inner shell 3 through the lower end thereof to the inner space of the duct 4, the said shrouding 1' being fixed on the main body of the hopper 1 with the lower periphery of the outer shell 2 placed on the outer periphery of the main body 1 of the hopper, the upper side of the shrouding 1' being walled by a plate 5. In the front opening is a door 6 which can be opened and shut, and in the front opening and in the front lower part are installed buffer plates 7 and 8, so that air curtain 9 can be formed in the upper opening walled by the plate 5. In the drawings, 10 refers to the cargo to be poured into the hopper, 11 to the dust, 12 to absorption element, 13 to absorption inlets, 14 to a transmitter, and 15 to detective apparatus.

Although the dust is generated in transfusing the cargo 10 into the main body 1 of the hopper, most of the dust is once forced into the duct 4 by the air blow caused by the falling cargo. Then, some time later, dust gradually settles in the main body 1 of the hopper, and the consequence is that the outflow of the dust can be remarkably reduced. A small portion of the dust remaining in the inner shell 3 in the shrouding 1' tends to be forced out. The dust pushed upward is, however, prevented from escaping to the outside by the air curtain 9. Also the dust that comes in to the front opening of the shrouding 1' is pushed back into the shrouding 1' by the baffle plate 7 and does not escape to the outside. When a strong wind is blowing, the air current in the shrouding 1' may be disturbed by the wind outside and the dust 11 that would otherwise be forced back into the shrouding 1' may flow out. In such a circumstance, however, by closing the door 6, the dust 11 can be confined within. That part of the dust that tends to fly up to the top without due to the falling cargo 10 can also be kept within by setting another baffle plate 8.

Moreover, it will be advantageous to make the duct in an inner-shell-like shape as is shown in FIGS. 1 through 8 because sufficient capacity can be obtained. In a case where there is no need of large capacity the duct may be constructed low as is shown in FIG. 9 and FIG. 10. When it is desired to increase dust collecting efficiency it will suffice to set up the duct all around the shrouding 1'. In this case, while the duct can be constructed large in the right, left, and in the rear, because it overlaps with the shrouding at its upper part, that part of the duct that comes in front of the shrouding can not be made large due to the fact that there the bucket comes in or goes out. Therefore, a small capacity duct may be installed in front of the shrouding at its low part as is shown in FIG. 8 and in FIG. 10. It goes without saying, however, that the expected effect can be obtained without above mentioned part of the duct.

In order to increase dust collecting efficiency it will suffice to equip the shrouding 1' with an absorption or suction apparatus in the back of said shrouding 1' so that the dust may be absorbed in here. In this arrangement, dust collecting efficiency can be further strengthened by setting an absorption mouth 13 in the inner shell 3 and a guide plate in the duct 4.

Since the hopper of the present invention is equipped with a shrouding having a duct on the main body 1 of said hopper, it displays the following effects:

(I) Since the dust generated by the pouring of the cargo into the hopper is once to flow into the duct and later settle down, and, as a result, that said dust does not escape outside, the hopper has excellent dust collecting efficiency.

(II) Since the hopper itself is capable of collecting dust sufficiently and needs no separate apparatus for collecting dust, the stationary hopper requires no wide space, and the movable hopper needs only a small type of apparatus for its movement on one hand, and on the other, since no machinery nor tools for a dust collecting apparatus are needed any longer, the hopper decreases in weight, and the cost of equipment can be saved to a great extent.

Moreover, if air curtain or a door which can be opened and/or closed freely in need is set up in the front opening (an entrance and exit for the cargo) and the upper opening of the shrouding. (In the drawings, a door is arranged in the front opening and air curtain in the upper opening; for purpose of closing these openings it makes no difference to use a door or air curtain.) The device of the invention will show, in addition to the above mentioned effects (I) and (II), the following effect:

(III) In comparison with the case where the opening is left open and the dust in the hopper tends to easily go out due to the wind passing through from the front opening upwardly, the hopper which is equipped with air curtain or a door in the upper opening can prevent the dust from being scattered outside on account of the upward outflux of the air and, by properly closing the air curtain or the door which is set up in the front opening, the dust can be confined within; consequently, the operation is made possible even when there is a strong wind outside and the efficiency of operation can be greatly improved.

It should further be noticed that by installing baffle plates in the front opening and at the low front of the shrouding as is shown in FIGS. 1 to 10 so that the dust inside is hit against, and forced back in, the cargo is prevented from being scattered outwardly by the baffle plate at the low front, the hopper can almost completely prevent the outflow of the dust in cooperation with the function of the duct. Besides, the efficiency in dust collection can be further improved by applying absorption or section device, as is shown in the drawings, to absorb the dust to the out.

Further, it will similarly prevent the dust generated in transfusing the cargo from being scattered and escaping outside to equip the main body 1 of the hopper (FIGS. 11–14) with a shrouding 1' having front and upper openings, with the lower periphery of said shrouding 1' being arranged on the outer periphery of the main body 1 of the hopper, baffle plates 16 being fixed at the low inside of the shrouding 1' in all directions, front, back, left and right, and on the both sides of the front opening 18 of the shrouding 1' being provided with other baffle plates 17. To explain this in detail, most of the dust which is generated in transfusing the cargo into the main body 1 of the hopper flows downward into the main body 1 of the hopper toward the baffle plates 16 as is indicated by the arrow $a$ due to the airflow caused by the falling cargo 10; as a result the outflow of the dust can be prevented to a considerable extent. Besides, if another baffle plate 17 is provided as is shown in the drawings the dust remaining in the shrouding 1' and moving toward the front opening 18 of said shrouding 1' is forced back into said shrouding 1' by the baffle plate 17 and does not flow out; moreover, if a door which freely opens and closes or air curtain is provided in the front and upper openings 18 and 19 the outflux of the dust can be prevented to a further extent.

Although only a case where baffle plates 16 are fixed inside on the lower part of the shrouding 1' is explained in the drawings, it goes without saying that the baffle plates 16 may be fixed inside of the main body 1 of the hopper on its upper part instead inside of the shrouding 1' at the lower part of said shrouding 1', that the number of the baffle plates 16 may be properly increased, that the baffle plates 16 may be installed on a part of the all four sides inside the shrouding 1' or the main body 1 of the hopper instead all around of those depending upon the conditions of operation, and so forth. Also, the baffle plates 16 can be made to rotate so that they can change their directions (to the direction indicated by an imaginary line $b$, for example) properly in case it is desired.

Thus, the hopper that is provided with baffle plates on the inner sides of the main body of said hopper is able to a considerable extent to prevent the dust from being scattered going out because the dust which is generated in transfusing the cargo into the said hopper flows downward into the main body of the hopper on account of said baffle plates. Since the hopper is provided the function to collect the dust by itself as explained above no independent device for dust collection is required in many cases. In such circumstances, the fixed type hopper needs no wide space and the movable type one can be handled with a small machine for movement and, since any apparatus for dust collection is not needed any longer, the weight of the machine can be decreased to that extent, and a considerable cost of the equipment can be saved.

Since it is desirable to minimize the distance wherethough the cargo must fall, it will be advantageous to provide apparatus 14 and 15 for level control such as shown in FIG. 8 that may control the fallen cargo to maintain the falling distance at a constant in such a way as is shown in FIG. 15, for example, where the main body 1 of the hopper is provided with a level detector 15, the apparatus 21 for opening and closing the hopper gate 20 and said level detector 15 are interlocked, and inside the main body 1 of the hopper are installed a transmitter 14 which sends signals to the level detector 15 and a protector 23 for protecting said transmitter 14, with said transmitter 14 being arranged in such a way as to send signals when the level of the cargo 22 is below a certain constant and to send signals when said level is over that constant. By this method the dust can be further prevented from being scattered.

When the transmitter 14 is covered by the cargo as is indicated by a hypothetical line $c$ no signals are sent forth and the gate 20 is opened, and when the surface of the cargo is at the level indicated by the solid line the transmitter 14 sends forth signals and the gate 20 is closed.

Consequently the level of the cargo is always kept above a certain constant and the distance between the surface of the cargo in the main body 1 of the hopper and the bucket moved to above said main body 1 of said hopper is maintained within a certain length, thus making it possible to eliminate the necessity of the up and down movement of the bucket in letting the cargo fall from the said bucket into the main body 1 of the hopper with a result that even when the bucket is opened immediately after arriving to above the hopper not much dust is generated.

So far the explanation of the case where the transmitter is so constructed that when there is much cargo in the main body 1 of the hopper it sends no signals and when there is little cargo it sends forth signals. It should be noted, however, that it will make no difference to construct the transmitter 14 in such a way as to send signals to open the gate 20 when there is much cargo in the main body 1 of the hopper, and not to transmit signals and the gate 20 closes when there is little cargo. Of course, it is quite possible to use various types of transmitter 14 having various structure.

Although the above explanation applies to a case where the cargo is transfused from a bucket into a hopper, the dust can be prevented from being scattered similarly in cases where a bucket is replaced by a skip or a damp car.

What I claim is:

1. A hopper for receiving, from a bucket or the like, a material which tends to create dust, comprising a lower container portion for containing the material which drops from the bucket, said lower container portion terminating in a top edge, and a shrouding fixed to and extending upwardly from said top edge of said lower container portion, said shrouding having opposed side walls and a rear wall and being open at its front and top, so that a bucket can be situated in the space between said side walls of said shrouding to drop material into said lower container portion with said shrouding suppressing the spreading of dust.

2. The combination of claim 1 and wherein said rear and side walls of said shrouding form an outer shell, an inner shell located inwardly of and spaced from said outer shell and terminating in a bottom edge spaced from said outer shell so that dust can rise into the space between said shells, and a top wall interconnecting said shells at their top ends.

3. The combination of claim 2 and wherein said inner shell is formed with openings communicating with the space between said shells, and an outlet tube connected to said outer shell and communicating with the space between said shells for withdrawing dust from said space.

4. The combination of claim 1 and wherein said side walls of said shrouding terminate at said front opening thereof in rearwardly directed baffles for directing dust rearwardly back toward the space between said side walls.

5. The combination of claim 1 and wherein said lower container portion has at its top edge curved baffles for directing dust which rises in said lower container portion back down into the latter.

6. The combination of claim 1 and wherein a door means is carried by said shrouding at said front opening thereof for opening and closing the same.

7. The combination of claim 1 and wherein a part of said inner shell extends across a lower part of the front opening of said shrouding at the region of the upper edge of said lower container portion for receiving dust which rises at the lower front portion of the front opening.

8. The combination of claim 1 and wherein a gate means coacts with said lower container portion for opening and closing the latter to control discharge of material therefrom, detector means in said lower container portion for detecting the elevation of material therein, and gate closing means actuated by said detecting means for automatically closing the gate when the material in the lower container portion of the hopper descends to a given level.

References Cited

UNITED STATES PATENTS

| | | | |
|---|---|---|---|
| 2,075,931 | 4/1937 | Eades | 214—17 XR |
| 2,111,663 | 3/1938 | Graemiger | 214—17 XR |
| 2,809,871 | 10/1957 | Ardern | 302—59 |

ROBERT G. SHERIDAN, *Primary Examiner.*